(12) United States Patent
Saha

(10) Patent No.: US 10,623,395 B2
(45) Date of Patent: Apr. 14, 2020

(54) SYSTEM AND METHOD FOR DIRECTORY SERVICE AUTHENTICATION ON A SERVICE PROCESSOR

(71) Applicant: DELL PRODUCTS, LP, Round Rock, TX (US)

(72) Inventor: Rajib Saha, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 501 days.

(21) Appl. No.: 15/398,280

(22) Filed: Jan. 4, 2017

(65) Prior Publication Data

US 2018/0191708 A1 Jul. 5, 2018

(51) Int. Cl.
| | | |
|---|---|---|
| H04L 29/06 | (2006.01) | |
| H04L 29/12 | (2006.01) | |
| G06F 21/85 | (2013.01) | |
| G06F 21/71 | (2013.01) | |
| G06F 21/31 | (2013.01) | |

(52) U.S. Cl.
CPC .......... H04L 63/0815 (2013.01); G06F 21/31 (2013.01); G06F 21/71 (2013.01); G06F 21/85 (2013.01); H04L 61/2571 (2013.01); H04L 61/1511 (2013.01); H04L 61/1523 (2013.01); H04L 61/2514 (2013.01); H04L 63/0853 (2013.01)

(58) Field of Classification Search
CPC ............. H04L 63/0815; H04L 61/2571; H04L 63/0853; H04L 61/1511; H04L 61/1523; H04L 61/2514; G06F 21/123; G06F 21/31; G06F 21/71; G06F 21/85
See application file for complete search history.

(56) References Cited

U.S. PATENT DOCUMENTS

| | | | |
|---|---|---|---|
| 8,166,539 B2 | 4/2012 | Pan | |
| 9,240,985 B1 * | 1/2016 | Potakamuri | ............ H04L 63/08 |
| 2004/0228063 A1 | 11/2004 | Hawkins et al. | |
| 2004/0249975 A1 * | 12/2004 | Tuck | ................. H04L 29/12066 709/245 |
| 2013/0191879 A1 * | 7/2013 | Jaber | ..................... G06F 21/552 726/1 |
| 2014/0146747 A1 * | 5/2014 | Dragan | ................. H04L 61/106 370/328 |
| 2014/0181895 A1 * | 6/2014 | Kelly | .................... H04L 63/102 726/1 |
| 2016/0103995 A1 | 4/2016 | Jacobs | |
| 2016/0182499 A1 * | 6/2016 | Sharaga | ............. H04L 63/0853 713/156 |

* cited by examiner

*Primary Examiner* — Yogesh Paliwal
(74) *Attorney, Agent, or Firm* — Larson Newman, LLP

(57) ABSTRACT

An information handling system includes host processor hardware and service processor hardware. The host processor hardware includes a network interface device that has an external network interface coupled to a domain controller and an internal network interface. The service processor hardware is coupled to the internal network interface, and is configured to receive a login request from a user via the internal network interface, to redirect the login request to the domain controller via the internal network interface, to receive authentication information for the user from the domain controller, and to log the user in to the service processor hardware in response to receiving the authentication information.

20 Claims, 3 Drawing Sheets

SYSTEM AND METHOD FOR DIRECTORY SERVICE AUTHENTICATION ON A SERVICE PROCESSOR

FIELD OF THE DISCLOSURE

This disclosure generally relates to information handling systems, and more particularly relates to directory service authentication on a service processor of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

An information handling system may include host processor hardware and service processor hardware. The host processor hardware may include a network interface device that has an external network interface coupled to a domain controller. The service processor hardware may be configured to receive a login request from a user via an internal network interface, to redirect the login request to the domain controller via the internal network interface, to receive authentication information for the user from the domain controller, and to log the user in to the service processor hardware in response to receiving the authentication information.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
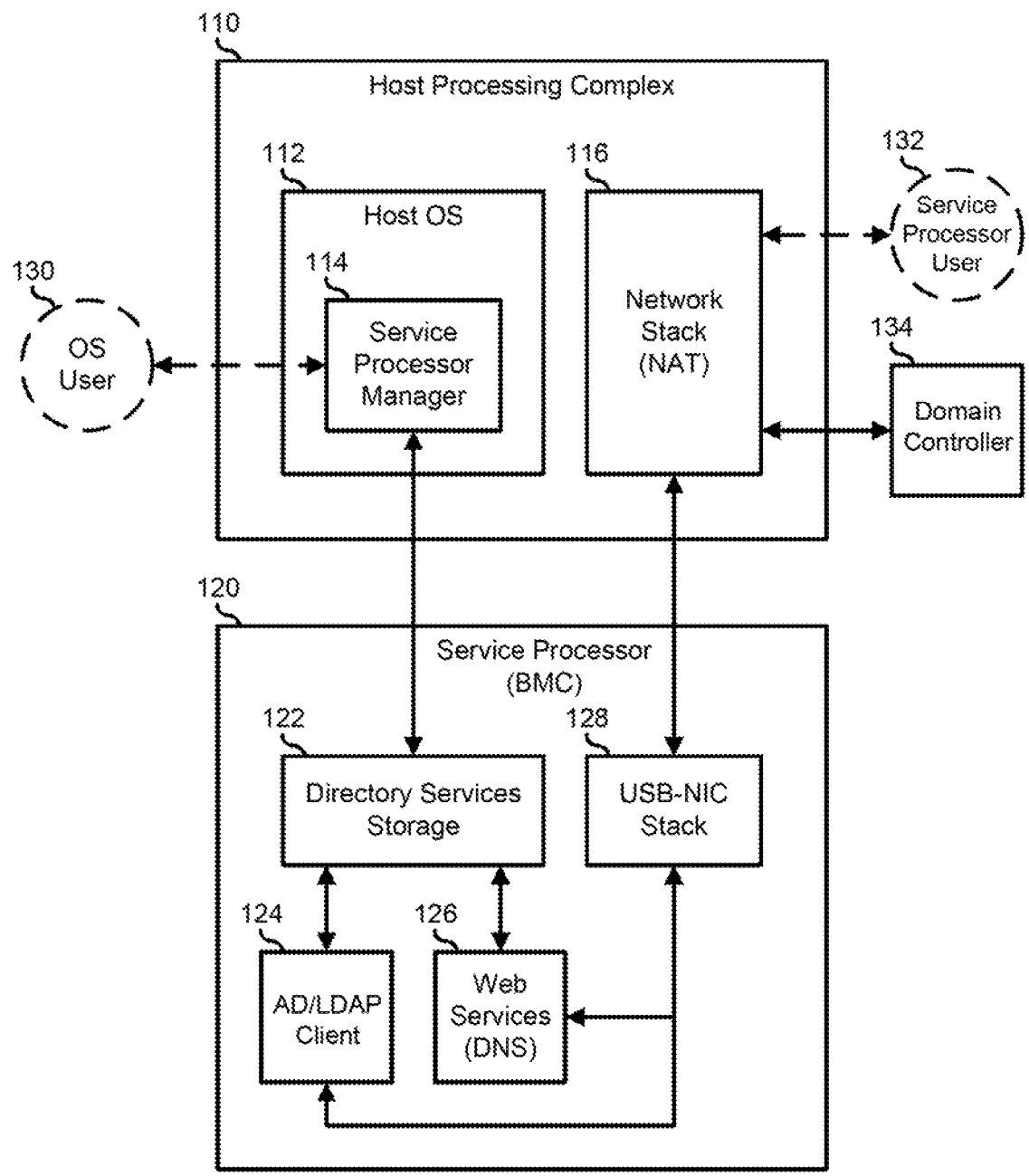
FIG. 1 is a block diagram illustrating an information handling system according to an embodiment of the present disclosure.

FIG. 1 illustrates an embodiment of an information handling system 100 that includes a host processing complex 110 and a service processor 120. Host processing complex 110 represents the computer hardware, firmware, and other elements that provide the computing platform upon which information handling system 100 performs its intended operations. For example, host processing complex 110 can include one or more processing elements, high bandwidth input/output (I/O) bridges for such elements as video devices or volatile memory storage devices, non-volatile memory devices such as FLASH devices or disk drives, network I/O devices, human interface devices (HID), or other devices as needed or desired. Host processing complex 110 also includes various operating code that is embedded with the host processing complex and that provides for the basic operations of the elements of the host processing complex. For example, host processing complex 110 can include code that functions to initialize the host processing complex and provides basic I/O routines for the host processing complex, such as a BIOS, a UEFI, or other platform centric code. Further, host processing complex 110 can include code that provides for operational routines for one or more of the elements of the host processing complex, such as drivers, application program interfaces (APIs), and the like. The specific implementation details of host processing complex 110 will be defined in accordance with a particular computer architecture and are well known in the art. Therefore the implementation details of host processing complex 110 will not be further disclosed herein, except as needed to further the present disclosure.

Host processing complex 110 includes a host operating system (OS) 112 and a network stack 116. Host OS 112 represents code to implement an operating environment for host processing complex 110 from which to launch, schedule, operate, and maintain various programs and applications that provide the intended operations of information handling system 100. In a particular embodiment, host OS 112 represents a multi-tenant operating system that permits multiple users to utilize the resources of information handling system 100, either simultaneously, or at separate times. The specific implementation details of host OS 112 may be defined in accordance with a particular operating system architecture and are well known in the art.

Network stack 116 operates to instantiate a service processor manager 114. Network stack 116 represents one or more network access points for host processing complex 110. For example, network stack 116 may include one or more network interface card (NIC) or host bus adapter (HBA) for various network standards, such as one or more Ethernet, Fibre Channel, 802.11, or other network technology standard. As such, network stack 116 may represent wired or wireless communications with various networks. Network stack 116 also represents various network services that are performed within the context of computer networking, such as a Domain Name System (DNS), Dynamic Host Configuration Protocol (DHCP), Network Address Translation (NAT), or other services as needed or desired.

Host processing complex 100 permits various elements to access the resources of the host processing complex. For example, one or more OS user 130 may log in to host OS 112 to obtain, manage, or direct the operations of host processing complex 110. As illustrated, OS user 130 accesses the resources of host processing complex 110 via various HID devices of the host processing complex, but this is not necessarily so, and the OS user may access the resources of the host processing complex via a network connection to network stack 116, as needed or desired. Further, a service processor user 132 may log in to service processor 120 as described below. For the purposes of the present disclosure, service processor user 132 accesses service processor 120 via a network connection to network stack 116. Host processing complex 110 is connected to a domain controller 134 via network stack 116. Domain controller 134 provides various security authentication services for information handling system 100, such as verifying log-in credentials for users logging in to the information handling system, checking and managing privilege and permission levels for the users, and the like.

Service processor 120 represents a separate processing complex of information handling system 100 from host processing complex 110. In particular, service processor 120 represents the hardware, firmware, and other elements of an embedded system for monitoring and controlling ancillary functions of information handling system 100 that are not necessarily related to the performance of the intended operations of the information handling system. In a particular embodiment, service processor 120 is provided by a system-on-a-chip (SoC) device that includes processing resources, memory resources, and I/O resources that are packaged on a single integrated circuit package. In another embodiment, service processor 120 includes one or more additional elements, such as external volatile or non-volatile memory or other elements, as needed or desired. In a typical configuration, service processor 120 operates in accordance with one or more Intelligent Platform Management Interface (IPMI) specifications to provide out-of-band monitoring, management, and control of the elements of information handling system 100, including the elements of host processing complex 110. In particular, service processor 120 operates to monitor, manage, and control such activities of information handling system 100 such as thermal monitoring and fan speed control, power supply monitoring and control, resource utilization management, and the like. Further, service processor 120 operates to monitor, manage, and control the configuration of host processing complex 110, including managing firmware updates, driver updates, and the like. In a typical configuration, service processor 120 represents an IPMI Baseboard Management Controller (BMC) or a proprietary IPMI device that includes proprietary functionality in addition to the functionality of a BMC. An example of a proprietary IPMI device includes an Integrated Dell Remote Access Controller (iDRAC), or another proprietary IPMI device, as needed or desired.

Service processor 120 includes a directory services storage 122, an Active Directory/Lightweight Directory Access Protocol (AD/LDAP) client 124, web services 126, and a Universal Serial Bus (USB) Network Interface Card (NIC) stack 128. Directory services storage 122 represents a storage area of a memory of service processor 120 that is reserved for providing an information store for the resources and services that are accessible to the service processor. In particular, directory services storage 122 includes mappings to elements of a network domain that includes service processor 120. An example of directory services storage 122 includes storage reserved for entries that are associated with a Microsoft Active Directory service or another LDAP compliant directory service. AD/LDAP client 124 represents elements of service processor 124 that are configured to affect the management of entries into directory services storage 122. Web services 126 represents various processes, procedures, and extensions that provide web-based services to service processor 120. In particular, web services 126 provide a Transmission Control Protocol/Internet Protocol (TCP/IP) overlay that enable communications with service processor 120 via the Internet or a private internet. In a particular embodiment, web services 126 operate to provide a Domain Name System service to service processor 120. USB-NIC stack 128 represents a communication channel between service processor 120 and host processing complex 110 via a hardware USB interface, but where the communications are managed as network traffic, such as an Ethernet-over-USB interface.

In a particular embodiment, network stack 116 includes a USB-NIC functionality that is connected to USB-NIC stack 128 to facilitate network communications with service processor 120. In addition, service processor 120 includes one or more additional data connections to host processing complex 110. For example, service processor 120 can communicate with host processing complex via a Low Pin Count (LPC) bus, an Inter-Integrated Circuit (I2C) bus, a System Management Bus (SMBus), or another communication link, as needed or desired. In particular, service processor manager 114 in host OS 112 can access a communication channel between host processing complex 110 and service processor 120 in order to configure and control the operation of the service processor. Such a communication channel can be deemed to be secure based upon the fact that the hardware of the communication channel consists of hardware in information handling system 100 that is not readily hacked. Such a secure hardware communication channel is hereafter referred to as In-Band Service Processor Access. Further, service processor 120 can include one or more additional internal communication channels, such as a Network Controller Sideband Interface (NC-SI) that permits the service processor to be connected to various network interface devices, such as a NIC or HBA In a typical configuration, service processor 120 is coupled via a network interface device to an isolated management network that provides a service processor user to directly access the service processor. Such a management network may include other service processors on other information handling systems, such as in a server data center. Here, the service processor user can access multiple assets of the data center to monitor, manage and control the multiple assets from a single location, such as a management system that is also connected to the network. In such a management network, secure access in provided by configuring service processor 120 with a secure login capability where login credentials are provided to the service processor that permit the user to log in to the service processor. Such login credentials are typically different from the login credentials that would be needed to log in to host OS 112.

In the present configuration, service processor 120 is not separately coupled to an isolated management network. Instead, a service processor user can access service processor manager 112 via a network connection to network stack 116. The service processor user then accesses the secure communication channel between service processor manager 112 and service processor 120, the IBSPA, to permit the service processor user to provide the service processor login credentials to the service processor, thereby logging in to the service processor. This configuration is common where the overhead of providing a separate management network is considered to be too high. However, this configuration suffers from the fact that a user needs to know and remember separate login credentials for logging in to host OS 112 and for logging in to service processor 120. Further, the user is unable to take advantage of centralized authentication services such as domain controller 134. This drawback may be simplified where each service processor in each information handling system is provided with the same default login credentials, such as where the information handling systems or their associated service processors are from a common manufacturer. However this drawback may be compounded where a particular manufacturer of service processors provides separate and distinct login credentials for each service processor manufactured.

In a particular embodiment of the present disclosure, the above drawback of needing to know and remember multiple sets of login credentials is mitigated by a system and method whereby a user can log in to service processor 120 using only the login credentials associated with host OS 112. Here, OS user 130 logs in to host OS 112 using the login credentials associated with the host OS, and accesses service processor manager 114. OS user 130 then pre-configure service processor 120 with various information that permits the service processor to redirect login requests received via USB-NIC stack 128 to domain controller 134. Then, service processor user 132 directs a login request to service processor 120 via USB-NIC 128, and service processor 120 redirects the login request to domain controller 134, and the domain controller authenticates the received login credentials to permit service processor user 132 to access the service processor. In this way, access to service processor 120 is managed for service processor user 132 on domain controller 134 in the same way that access to host OS 112 is managed for OS user 130. Thus, in a particular embodiment, domain controller 134 includes login credentials and the associated permissions for various users. The permissions can include one or more of permission to access host OS 112 and permission to access service processor 120. Here, a first group of users can be provided with access only to host OS 112, such as users who need only access to the intended operations of information handling system 100, and who have no need to access the functions of service processor 120. Similarly, another group of users can be provided with access to only service processor 120, such as data center administrators who may have no need to access the intended operations of information handling system 100. Finally a third group of users can be provided with access to both host OS 112 and service processor 120, such as an administrator of the software and services provided by the intended operations of information handling system 100. In all three cases, the users and groups can be administered via domain controller 134, and each group of users only needs to know and remember one set of login credentials.

Figure 2:
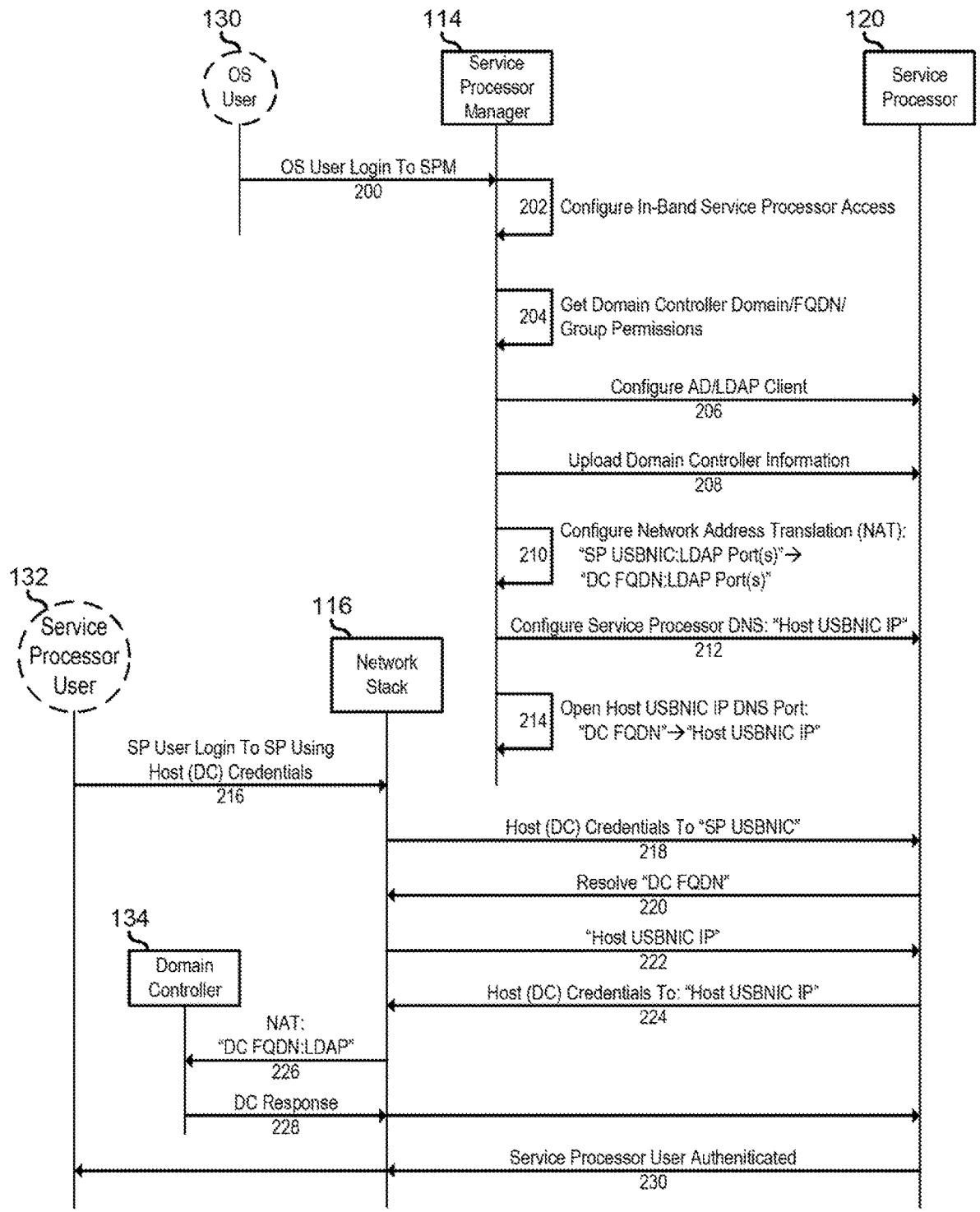
FIG. 2 illustrates a method for directory service authentication on a service processor on the information handling system of FIG. 1.

FIG. 2 illustrates a method for directory service authentication on a service processor on information handling system 100. In a first portion of the method, where information handling system 100 is pre-configured, OS user 130 logs in to service processor manager 114 in step 200. For example, OS user 130 can have permission to access service processor manager 114 based upon their login credentials, as may be verified by domain controller 134. The details of logging in to host OS 112 and of restricting access to service processor manager 114 are known in the art and are beyond the scope of the present disclosure. Thus, for the purposes of the present disclosure, OS user 130 will be assumed to have login credentials which provide the OS user with access to service processor manager 114.

OS user 130 configures service processor manager 114 to establish the secure communication channel, the IBSPA, with service processor 120 in step 202, and provides the hooks needed to obtain user authentication from domain controller 116 to the service processor manager in step 204. The hooks can include the domain associated with domain controller 134, a Fully Qualified Domain Name (FQDN) associated with the domain controller, group permissions associated with OS user 130 and other users, a Certificate Authority (CA) certificate associated with the domain controller, and other information as needed or desired to invoke the domain controller to authenticate a user, as needed or desired. Service processor manager 114 configures AD/LDAP client 126 to update directory services storage 122 with the domain controller information in step 206, and uploads the domain controller information to the directory services storage via the secure channel, the IBSPA, in step 208.

OS user 130 then configures network stack 116 to provide a translated address in the NAT of the network stack, such that packets received from service processor 120 via USB-NIC stack 128, and that are directed to an LDAP port, are forwarded to the LDAP port of domain controller 134 in step 210. In particular, the NAT in network stack 128 is configured such that packets from "SP USBNIC IP:LDAP" are forwarded to "DC FQDN:LDAP." Note that, as illustrated, service processor manager 114 configures network stack 116, but this is not necessarily so. In particular, service processor manager 114 may include the functionality to configure network stack 116, or another utility of host OS 112 may be utilized to configure the network stack, as needed or desired. OS user 130 then configures a DNS server operating on web services 126 of service processor 120 to answer to packets addressed to the host USB-NIC stack of network stack 116 in step 212. In particular, the DNS of web services 126 is configured to answer to "Host USBNIC IP." OS user 130 then opens the DNS port of network stack 114, and configures the DNS to resolve requests to domain controller 134 to the USB-NIC of the network stack in step 214. In particular, the DNS is configured to resolve "DC FQDN" to "Host USBNIC IP." As noted above with respect to configuring the NAT of network stack, the configuration of the DNS is illustrated as being performed by service processor manager 114, but this is not necessarily so, and another utility can be utilized to configure the DNS, as needed or desired. At this point, the pre-configuration of information handling system 100 is completed, and the DNS of network stack 116 listens for DNS requests to "DC FQDN."

In a second portion of the method of FIG. 2, an attempt by service processor user 132 to log in to service processor 120 using login credentials associated with domain controller 134 is received by network stack 116 via a network connection at step 216. In particular, the login request will be addressed to "SP USBNIC" and will include login credentials directed to "DC FQDN." Network stack 116 forwards the login request to service processor 120 via USB-NIC stack 128 in step 218. Having receive the credential redirect to "DC FQDN," service processor 120 and USB-NIC stack 128 being unable to resolve the address, the service processor will provide a DNS request to network stack 120 to resolve "DC FQDN" in step 220. Network stack 116 resolves "DC FQDN" to "Host USBNIC IP" in step 222 and forwards the DNS response to service processor 120 in step 222. Service processor 120 then forwards the login request including the login credentials associated with domain controller 134 to network stack 116 in step 224. Note that the forwarded login request from service processor 120 will be received from AD/LDAP client 126, and will thus have a source address of "SP USBNIC:LDAP." As such, when the forwarded login request is received by network stack 116, the NAT on the network stack, being configured as described in step 210, above, forwards packets from "SP USBNIC:LDAP" to "DC FQDN:LDAP," the network stack forwards the login request to domain controller 134 in step 226. Domain controller 134 authenticates the login credentials included in the login request, and provides an authentication response to network stack 116 which is forwarded to service processor 120 in step 228. Then, assuming the login credentials were authenticated, service processor user 132 is authenticated onto service processor 230 in step 230.

Figure 3:
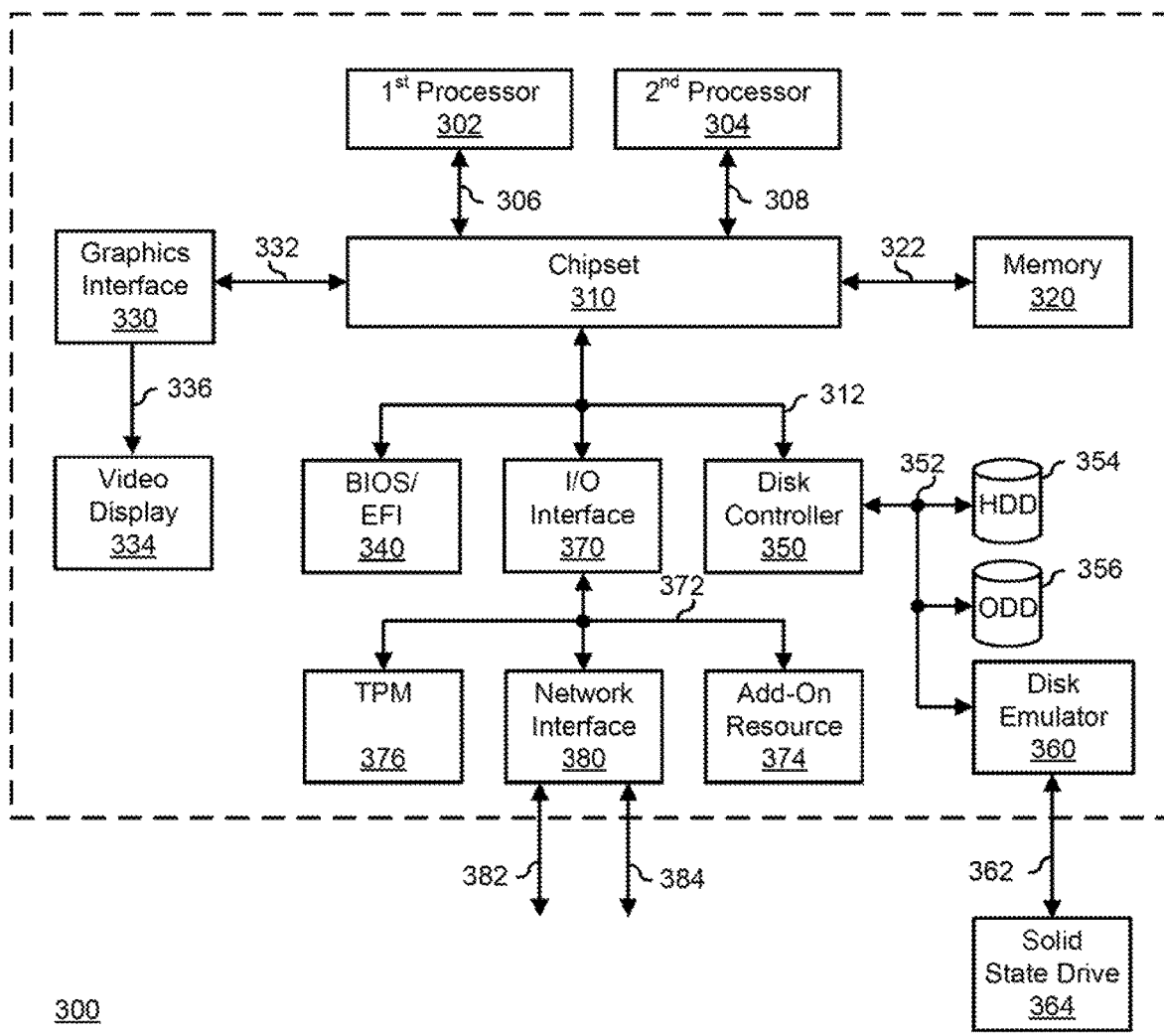
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    host processor hardware including a network interface device, wherein the network interface device includes an external network interface coupled to a domain controller and includes an internal network interface, the host processor hardware configured to receive a login request from a user, and to authenticate the user to a hosted environment instantiated on the host processor hardware; and
    baseboard management controller hardware coupled to the internal network interface, the baseboard management controller hardware configured to receive the login request via the internal network interface, to redirect the login request to the domain controller via the internal network interface, to receive authentication information for the user from the domain controller, and to log the user in to the baseboard management controller hardware in response to receiving the authentication information;
    wherein the host processor hardware is further configured to determine that the user is authorized to log in to the baseboard management controller based upon the authentication of the user to the hosted environment, and to forward the login request to the baseboard management controller in response to determining that the user is authorized to log in to the baseboard management controller.

2. The information handling system of claim 1, wherein:
    the baseboard management controller hardware is further coupled to the host processor hardware via a secure hardware interface; and
    the baseboard management controller hardware is further configured to receive configuration information from the secure hardware interface, the configuration information to configure the baseboard management controller hardware to redirect the login request to the domain controller.

3. The information handling system of claim 2, wherein the host processor hardware further includes a baseboard management controller manager coupled to the baseboard management controller hardware, the baseboard management controller manager configured to provide the configuration to the baseboard management controller hardware.

4. The information handling system of claim 3, wherein the configuration information comprises a Fully Qualified Domain Name (FQDN) of the domain controller.

5. The information handling system of claim 1, wherein the login request comprises a Fully Qualified Domain Name (FQDN) of the domain controller.

6. The information handling system of claim 5, wherein the baseboard management controller hardware is further configured to send a Domain Name Service (DNS) request to the network interface device in response to receiving the login request, wherein the DNS request is based upon the FQDN of the domain controller.

7. The information handling system of claim 6, wherein the network interface device is further configured to provide a DNS response to the DNS request to the baseboard management controller hardware, wherein the DNS response includes redirect information to redirect the login request to the network interface device.

8. The information handling system of claim 7, wherein the baseboard management controller hardware is further configured to redirect the login request to the network interface device in response to receiving the DNS response.

9. The information handling system of claim 8, wherein the network interface device is further configured to provide a Network Address Translation (NAT) service whereby the login request from the baseboard management controller hardware is forwarded to the FQDN of the domain controller.

10. The information handling system of claim 1, wherein the baseboard management controller hardware comprises a Baseboard Management Controller.

11. A method, comprising:
    providing, on a network interface device of host processor hardware, an external network interface coupled to a domain controller;
    providing, on the network interface device, an internal network interface;
    coupling baseboard management controller hardware to the internal network interface;
    receiving, by the host processor hardware, a login request from a user;
    authenticating, by the host processor hardware, the user to a hosted environment instantiated on the host processor hardware;
    determining, by the host processor hardware, that the user is authorized to log in to the baseboard management controller based upon the authentication of the user to the hosted environment;
    forwarding, by the host processor hardware, the login request to the baseboard management controller in response to determining that the user is authorized to log in to the baseboard management controller;

receiving, by the baseboard management controller hardware, the login request via the internal network interface;

redirecting, by the baseboard management controller hardware, the login request to the domain controller via the internal network interface;

receiving, by the baseboard management controller hardware, authentication information for the user from the domain controller; and logging the user in to the baseboard management controller hardware in response to receiving the authentication information.

12. The method of claim 11, further comprising:

coupling the baseboard management controller hardware to the host processor hardware via a secure hardware interface; and receiving, by the baseboard management controller hardware, configuration information from the secure hardware interface, the configuration information to configure the baseboard management controller hardware to redirect the login request to the domain controller.

13. The method of claim 12, further comprising:

coupling a baseboard management controller manager of the host processor hardware, to the baseboard management controller hardware; and providing, by the baseboard management controller manager, the configuration to the baseboard management controller hardware.

14. The method of claim 13, wherein the configuration information comprises a Fully Qualified Domain Name (FQDN) of the domain controller.

15. The method of claim 11, wherein the login request comprises a Fully Qualified Domain Name (FQDN) of the domain controller.

16. The method of claim 15, further comprising:

sending, by the baseboard management controller hardware, a Domain Name Service (DNS) request to the network interface device in response to receiving the login request, wherein the DNS request is based upon the FQDN of the domain controller.

17. The method of claim 16, further comprising:

providing, by the network interface device, a DNS response to the DNS request to the baseboard management controller hardware, wherein the DNS response includes redirect information to redirect the login request to the network interface device.

18. The method of claim 17, further comprising:

redirecting, by the baseboard management controller hardware, the login request to the network interface device in response to receiving the DNS response.

19. The method of claim 18, further comprising:

configuring the network interface device to provide a Network Address Translation (NAT) service whereby the login request from the baseboard management controller hardware is forwarded to the FQDN of the domain controller.

20. A non-transitory computer-readable medium including code for performing a method, the method comprising:

providing, on a network interface device of host processor hardware, an external network interface coupled to a domain controller;

coupling baseboard management controller hardware to an internal network interface;

receiving a login request from a user;

authenticating the user to a hosted environment instantiated on the host processor hardware;

determining that the user is authorized to log in to the baseboard management controller based upon the authentication of the user to the hosted environment;

forwarding the login request to the baseboard management controller in response to determining that the user is authorized to log in to the baseboard management controller;

receiving, by the baseboard management controller hardware, the login request via the internal network interface;

redirecting, by the baseboard management controller hardware, the login request to the domain controller via the internal network interface;

receiving, by the baseboard management controller hardware, authentication information for the user from the domain controller; and logging the user in to the baseboard management controller hardware in response to receiving the authentication information.

* * * * *